(12) United States Patent
Pahlevaninezhad et al.

(10) Patent No.: US 12,719,272 B1
(45) Date of Patent: Aug. 25, 2026

(54) SELF-CONTAINED MICROINVERTER FOR COUPLING BETWEEN A PV PANEL AND A THREE PHASE AC BUS FOR AN AC GRID

(71) Applicant: Sparq Systems Inc., Kingston (CA)

(72) Inventors: Majid Pahlevaninezhad, Kingston (CA); Praveen K. Jain, Kingston (CA)

(73) Assignee: Sparq Systems Inc., Kingston (CA)

( * ) Notice: Subject to any disclaimer, the term of this patent is extended or adjusted under 35 U.S.C. 154(b) by 0 days.

(21) Appl. No.: 19/221,671

(22) Filed: May 29, 2025

(51) Int. Cl.
*H02J 1/12* (2026.01)
*H02J 3/38* (2026.01)
*H02J 101/24* (2026.01)

(52) U.S. Cl.
CPC *H02J 1/12* (2013.01); *H02J 3/38* (2013.01); *H02J 2101/24* (2026.01)

(58) Field of Classification Search
CPC ........ H02J 1/12; H02J 3/38; H02J 3/40; H02J 3/44; H02J 3/46; H02J 3/466; H02J 3/50; H02J 2101/24
USPC ........................................................... 307/43
See application file for complete search history.

(56) References Cited

U.S. PATENT DOCUMENTS

2015/0163949 A1* 6/2015 Zhang .................... H02J 3/381 361/622

* cited by examiner

*Primary Examiner* — Hal Kaplan
(74) *Attorney, Agent, or Firm* — Brion Raffoul

(57) ABSTRACT

A microinverter for use with a single photovoltaic (PV) panel. The self-contained unitary package includes a low voltage power module (LVPM), a high voltage power module (HVPM), a transformer passing power between the two modules, a DC filter to filter incoming DC power from the PV panel, and an AC power to filter 3-phase power to be provided to an AC power bus connected to an AC power grid. The microinverter package couples to a single PV panel and converts incoming DC power from the PV panel to 3 phase AC power suitable for the AC power grid. All necessary electronics and conversion circuitry and components are contained in the package and provides a plug and play solution between the PV panel and the AC grid.

17 Claims, 16 Drawing Sheets

SELF-CONTAINED MICROINVERTER FOR COUPLING BETWEEN A PV PANEL AND A THREE PHASE AC BUS FOR AN AC GRID

TECHNICAL FIELD

The present invention relates to power generation. More specifically, the present invention relates to systems and methods for generating AC power from DC power sources using a monolithic, silicon-based microinverter that is directly coupled between a DC power source and an AC power bus.

BACKGROUND

There is a growing number of photovoltaic (PV) applications where direct current/alternating current (DC/AC) inverters are required to provide maximum power point tracking (MPPT) so as to harvest maximum solar energy from PV panels and to thereby feed clean AC electricity into the power grid. In the various configurations of solar energy harvesting systems, a DC/AC inverter is used as the interface to the utility grid. The grid-connected DC/AC inverter plays a crucial role in the performance and reliability of solar energy harvesting systems.

Inverters come in multiple forms and architectures. There are several power architectures used for solar energy harvesting systems such as microinverters, string inverters and central inverters. Microinverters are commonly used for residential applications, string inverters are usually used for commercial and industrial (C&I) applications, while central inverters are mostly used for solar farms. Such microinverters, string inverters, and central inverters are usually connected to an AC bus at the secondary distribution levels (e.g., 240V split-phase, 208V three-phase, 400V three-phase, 480V three-phase, 630V three-phase). This AC bus is connected to a transformer that transforms the voltage at the secondary distribution (Low Voltage: LV) to a voltage for the primary distribution (Medium Voltage: MV), in the range of 1-35 kV. FIG. 1 illustrates such system.

Such LV/MV transformers are costly and can degrade the overall conversion efficiency of the system. These transformers also require maintenance and can be a point of failure for the solar energy harvesting system. This is mostly due to their complex thermal management.

As shown in FIG. 1, for high power applications, central inverters are commonly used for such solar power harvesting systems. These central inverters are used mainly due to their cost advantage when compared to string inverters and microinverters. However, the performance of such central inverters is highly compromised since these central inverters cannot perform independent maximum power point tracking for PV panels. When the different inverters are compared in terms of performance, microinverters have the highest performance when compared to string inverters and to central inverters. This high performance is due to the microinverters' ability to perform independent maximum power point tracking. However, the high cost of such microinverters is a major prohibitive factor that prevents their more widespread use them in high power applications (i.e., in applications that need higher voltages than medium voltage (MV)). Thus, despite their inadequate performance, central inverters dominate this sector due to their cost benefits.

Based on the above, there is therefore a need for solutions that can perform independent maximum power point tracking while simultaneously mitigating, if not avoiding, the shortcomings of the prior art.

SUMMARY

The present invention provides systems and methods relating to a microinverter for use with a single photovoltaic (PV) panel. The self-contained unitary package includes a low voltage power module (LVPM), a high voltage power module (HVPM), a transformer passing power between the two modules, a DC filter to filter incoming DC power from the PV panel, and an AC power to filter 3-phase power to be provided to an AC power bus connected to an AC power grid. The microinverter package couples to a single PV panel and converts incoming DC power from the PV panel to 3 phase AC power suitable for the AC power grid. All necessary electronics and conversion circuitry and components are contained in the package and provides a plug and play solution between the PV panel and the AC grid.

In a first aspect, the present invention provides a microinverter comprising:

- a low voltage power module (LVPM) that receives a power signal directly from a photovoltaic (PV) panel and conditions said power signal;
- a transformer receiving power from said LVPM on said transformer's primary side;
- a high voltage power module (HVPM) that receives converted AC power from said transformer and converts said AC power into three phase AC power for direct provision to an AC power bus, wherein

- said microinverter is for directly connecting to a single PV panel;
- said transformer provides galvanic isolation between said LVPM and said HVPM, said transformer being coupled to said LVPM and to said HVPM;
- said microinverter is for directly connecting to said AC power bus, said AC power bus being for providing 3 phase AC power to an AC power grid;
- said microinverter is packaged as a single unitary device.

In one aspect, prior to being received by said LVPM, said power signal from said PV panel is filtered by a DC filter. In another aspect, prior to being received by said AC power bus, said 3 phase AC power from said HVPM is filtered by an AC filter. The DC filter may be integrated into said single unitary device. As well, AC filter may be integrated into said single unitary device.

In a further aspect, semiconductors in said LVPM are controlled by a DC side digital control subsystem. This DC side digital control subsystem may be integrated into said single unitary device. As well, semiconductors in said HVPM are controlled by an AC side digital control subsystem. This AC side digital control subsystem may be integrated into said single unitary device.

As another aspect, the LVPM comprises:

- at least one string of circuit element modules, each of said at least one string of circuit element modules being coupled in parallel between a positive DC input and a negative DC input;

wherein

- each string of circuit element modules comprises a plurality of circuit element modules coupled in series;
- each string of circuit element modules produces an output received by said transformer, said output being tapped from a midpoint of said string of circuit element modules;

each string of circuit element modules further comprises a high frequency storage block for storing power, said high frequency storage block being coupled to said string of circuit element modules at multiple coupling points on said string of circuit element modules, each of said multiple coupling points being between a pair of circuit element modules coupled in series to one another in said string of circuit element modules.

In a further aspect, the HVPM comprises:

a high frequency rectifier block for receiving an output of the transformer;

a DC/AC converter block producing outputs of said HVPM;

wherein said high frequency rectifier block is coupled in parallel with said DC/AC converter block between a positive bus input and a negative bus input to said microinverter.

In yet another aspect, the high frequency rectifier block comprises:

a string of circuit element modules, said string of circuit element modules comprising a plurality of circuit element modules coupled in series, wherein an input to said high frequency rectifier block is received at a midpoint of said string of circuit element modules.

A further aspect provides that the DC/AC converter block comprises:

a plurality of strings of circuit element modules coupled in parallel with one another, each of said plurality of strings of circuit element modules providing one output of said HVPM;

wherein each of said plurality of strings of circuit element modules comprises a plurality of circuit element modules coupled in series;

for each string of circuit element modules, said one output is tapped from a midpoint of said string of circuit element modules;

each string of circuit element modules further comprises a high frequency storage block for storing power, said high frequency storage block being coupled to said string of circuit element modules at multiple coupling points on said string of circuit element modules, each of said multiple coupling points being between a pair of circuit element modules coupled in series to one another in said string of circuit element modules.

For this aspect of the present invention, the plurality of strings of circuit element modules comprises three strings of circuit element modules producing three phase AC power for said AC power bus.

Yet another aspect of the present invention provides that the high frequency storage blocks used in said microinverter comprises capacitor banks.

Further, the DC filter comprises a ferrite core coupled between a first capacitor and a second capacitor, said second capacitor providing a positive DC input and a negative DC input to said LVPM, said first capacitor being between said ferrite core and a DC connector that connects to said one PV panel.

In yet another aspect, the AC filter comprises a ferrite core coupled between a first group of capacitors and a second group of capacitors, said first group of capacitors receiving three phase AC power from said HVPM and said second group of capacitors being coupled between said ferrite core and an output connector, said output connector being for connecting to said AC power bus.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
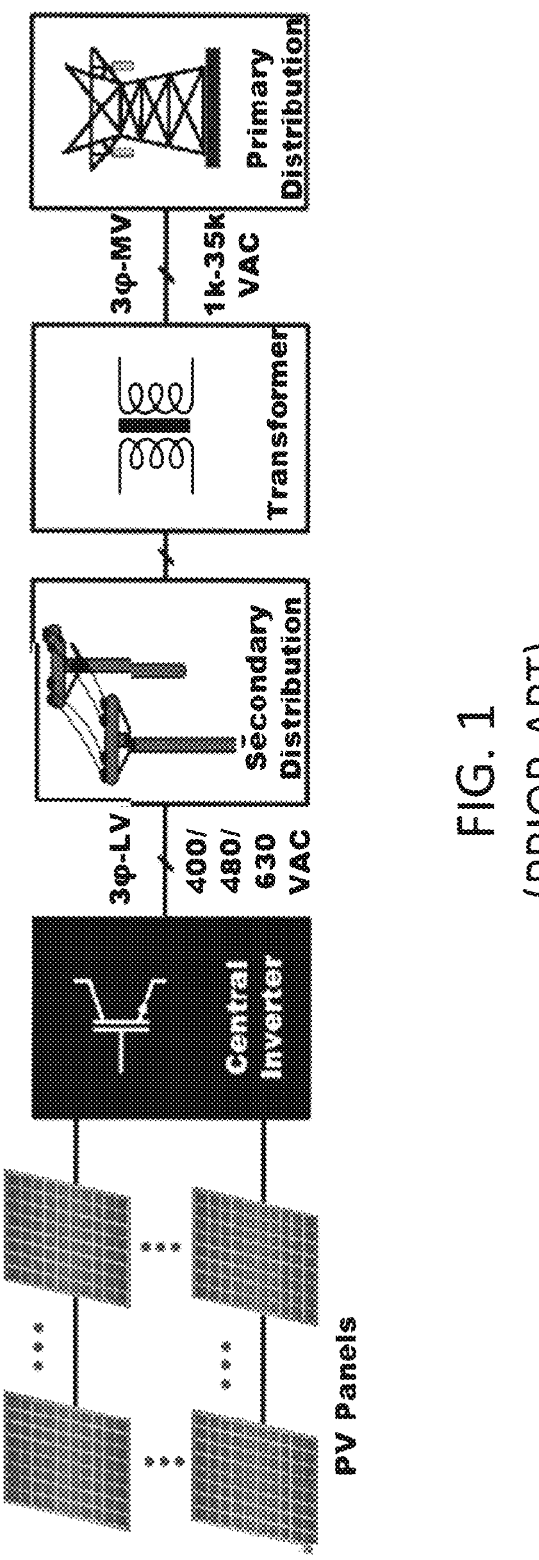
FIG. 1 is a block diagram of a typical solar energy power system according to the prior art.
Figure 2:
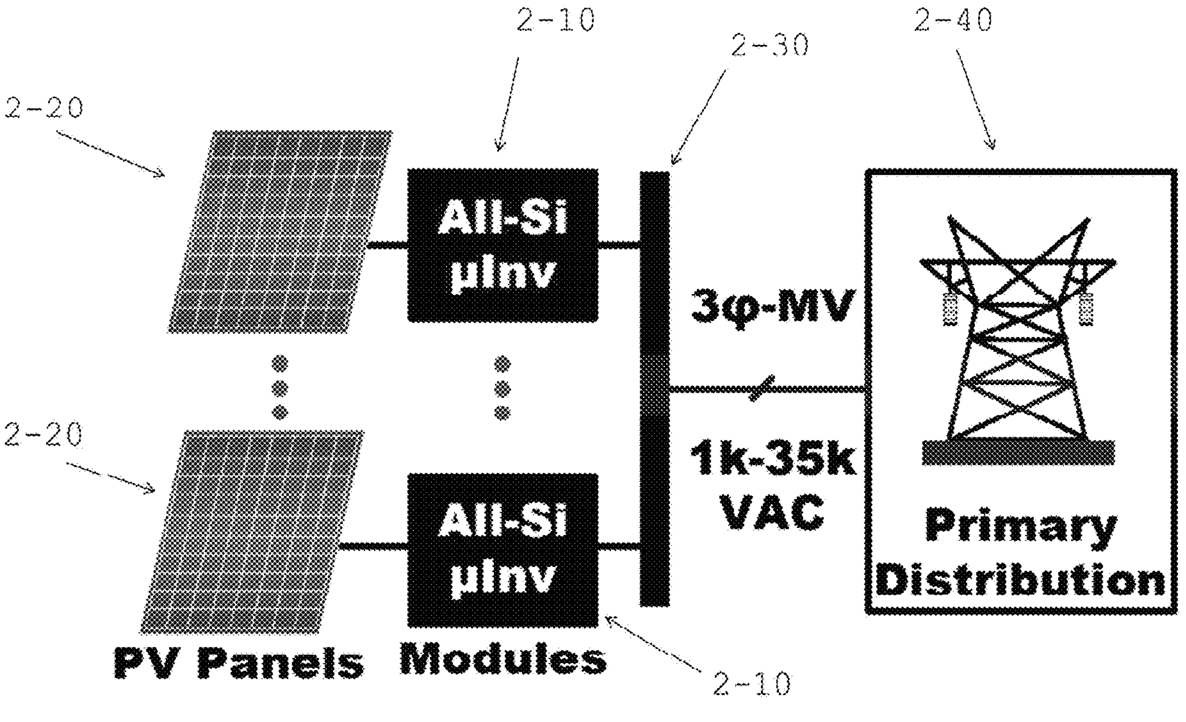
FIG. 2 is a block diagram of a solar energy power system incorporating one aspect of the present invention.

Referring to FIG. 2, illustrated is a block diagram of a virtually-all-Silicon (VA-Si) Photovoltaic (PV) microinverter according to one aspect of the present invention. As can be seen from the figure, the microinverter converts DC power to AC power compatible with the primary distribution voltage. Thus, the microinverter eliminates the need for an LV/MV transformer and the microinverter directly connects to the primary distribution bus. As noted above, this microinverter according to one aspect of the present invention can also provide independent maximum power point tracking for the PV panels. FIG. 2 shows that the microinverter 2-10 is directly coupled between PV panels 2-20 and an AC power bus 2-30. This AC power bus 2-30 provides AC power to a primary distribution power grid 2-40.

For clarity, the VA-Si microinverter includes integrated semiconductors and receives the PV voltage as an input and produces a three-phase AC power compatible with the primary distribution system (~1-35 kV).

Figure 3:
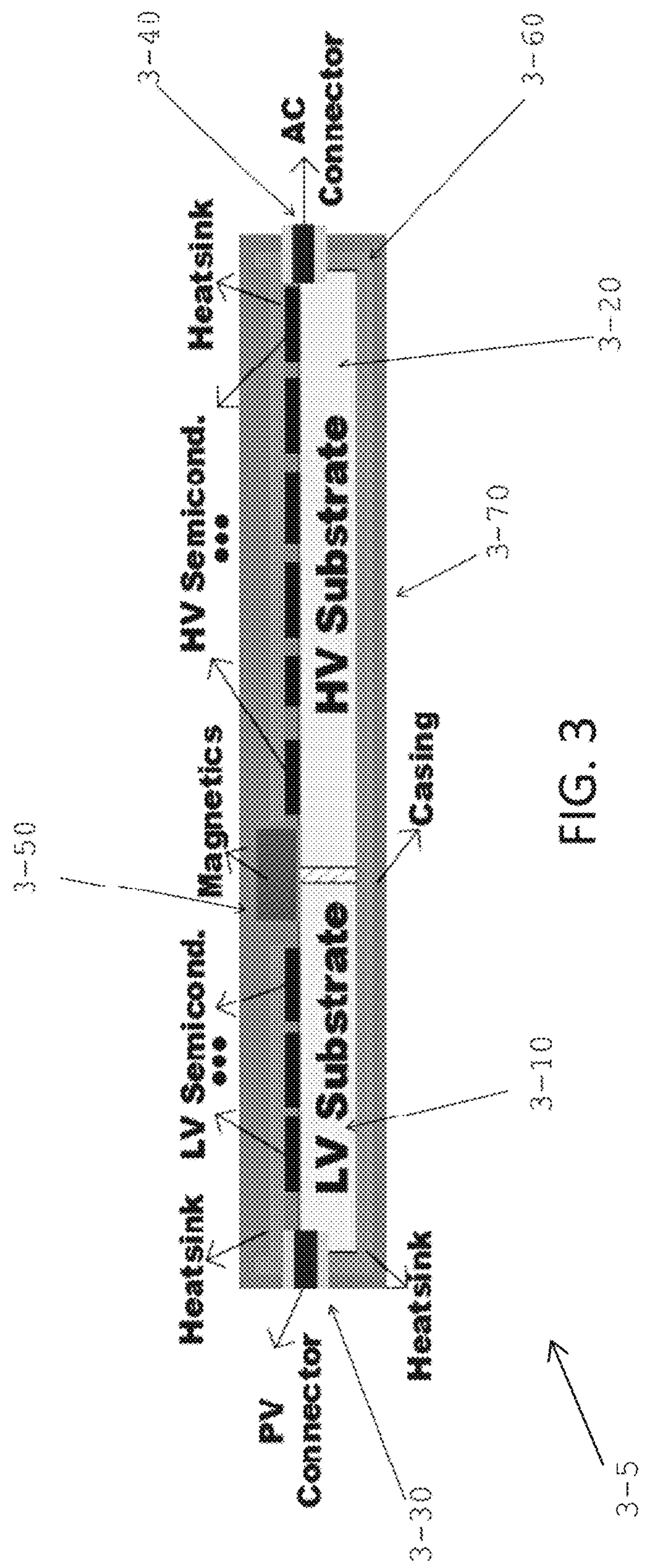
FIG. 3 illustrates a view of a cut-away of one aspect of the present invention.

Referring to FIG. 3, an exemplary block diagram of the proposed VA-Si PV microinverter is illustrated. As can be seen from the figure, the microinverter 3-5 includes:

an LV Substrate (Low-Voltage Substrate) 3-10. This component accommodates the PV-side power semiconductors along with their drive circuitry and control systems, an HV Substrate (High-Voltage Substrate) 3-20. This component accommodates the grid-side power semiconductors along with their drive circuitry and control systems, a PV Connector 3-30. This component connects the output wires of the PV panel to the microinverter 3-5, an AC Connector 3-40. This component connects the output wires of the PV panel to the microinverter 3-5, Magnetics 3-50. This collection of components may include the transformer between the PV-side and the grid-side for galvanic isolation as well as the filters for the PV side and for the grid side, Heatsink 3-60. This component is responsible for the heat transfer from the power semiconductors to the outside of the microinverter, Casing 3-70. The casing is designed to encapsulate/cover the entire microinverter system and provide enough insulation for safety purposes.

Figure 4:
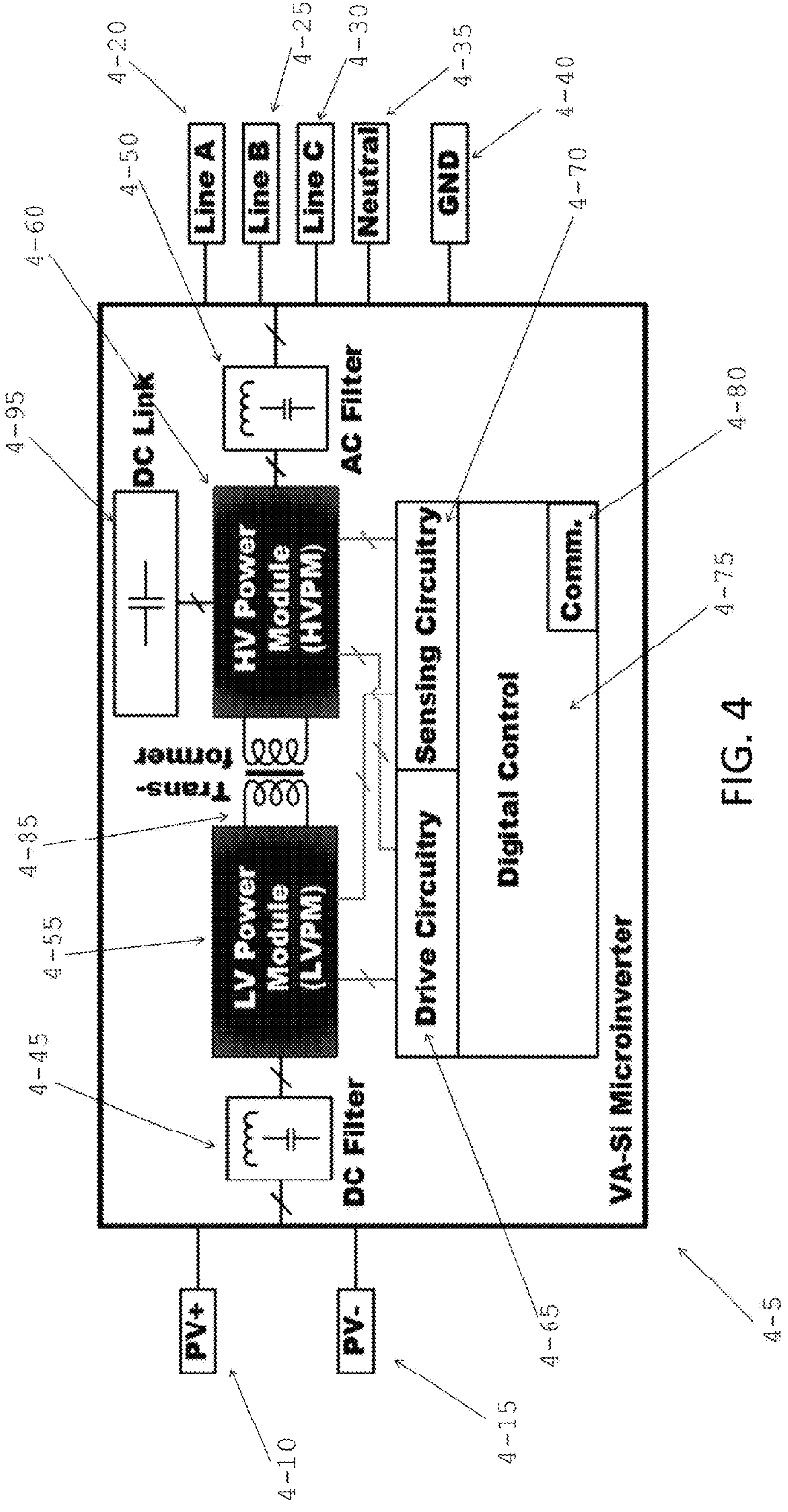
FIG. 4 is a block diagram of a microinverter according to one aspect of the present invention.

Referring to FIG. 4, an exemplary arrangement of the VA-Si PV microinverter 4-5 according to one aspect of the present invention is illustrated. As can be seen from the figure, the PV+ and PV− couplers 4-10, 4-15 are connected to the microinverter 4-5 to the PV-side, and Line A, Line B, Line C, Neutral, and Ground couplers 4-20, 4-25, 4-30, 4-35, 4-40 are connected to the microinverter 4-5 at the AC side. In addition to the above, the microinverter 4-5 includes the following blocks:

A DC Filter 4-45 that performs the differential-mode (DM) and common-mode (CM) filtering at the PV-side of the VA-Si PV microinverter 4-5, An AC Filter 4-50 that performs the differential-mode (DM) and common-mode (CM) filtering at the AC grid-side of the VA-Si PV microinverter 4-5, An LVPM (Low-Voltage Power Module) 4-55 that includes the power semiconductors for the PV-side of the VA-Si microinverter 4-5, An HVPM (How-Voltage Power Module) 4-60 that includes the power semiconductors for the grid-side of the VA-Si microinverter 4-5, Drive Circuitry 4-65 that drives the power semiconductors in both the LVPM 4-55 and HVPM 4-60, Sensing Circuitry 4-70 that senses and produces the required measurement signals from various parts of the power circuit, Digital Control circuitry 4-75 that implements various control loops required for operation of the VA-Si PV microinverter 4-5, Communication circuitry 4-80 that includes circuitry a communications link between the microinverter 4-5 and outside world, and A Transformer 4-85 that provides galvanic isolation between the PV-side and the grid-side of the microinverter 4-5.

As can be seen, the drive circuitry 4-65 is coupled to send/receive signals from both the LVPM 4-55 and HVPM 4-60. As well, sensing circuitry 4-70 receives signals from the LVPM 4-55 and HVPM 4-60. The measurements produced by sensing circuitry 4-70 are sent to and are used by the digital control circuitry 4-75 as well as, if necessary, by drive circuitry 4-65. As can also be seen, the DC filter 4-45 is coupled between the PV couplers 4-10, 4-15 and LVPM 4-55. The AC filter 4-50 is coupled between the HVPM 4-60 and the various output couplers 4-20, 4-25, 4-30, 4-35, 4-40. The microinverter also includes a DC-link 4-95.

For clarity, while the digital control circuitry for both the LVPM and HVPM (while separate from one another) may be pictured as being in the same package as the microinverter as a whole, this co-location of the LVPM and the HVPM with their control circuitry is a preferred embodiment but is not necessary. Co-locating the LVPM and the HVPM with their digital control circuitry in the same package, while preferable, is not necessary for proper functioning of the microinverter as a whole. The control circuitry may be in another module, in another package, or in another location. However, as can be imagined, placing the LVPM and the HVPM and their digital control circuitry in the same package (along with the necessary transformer, filters, and other components) provides a simpler, more convenient package. A self-contained, independent microinverter would thus be the result of placing all the components in a single convenient package.

Figure 5:
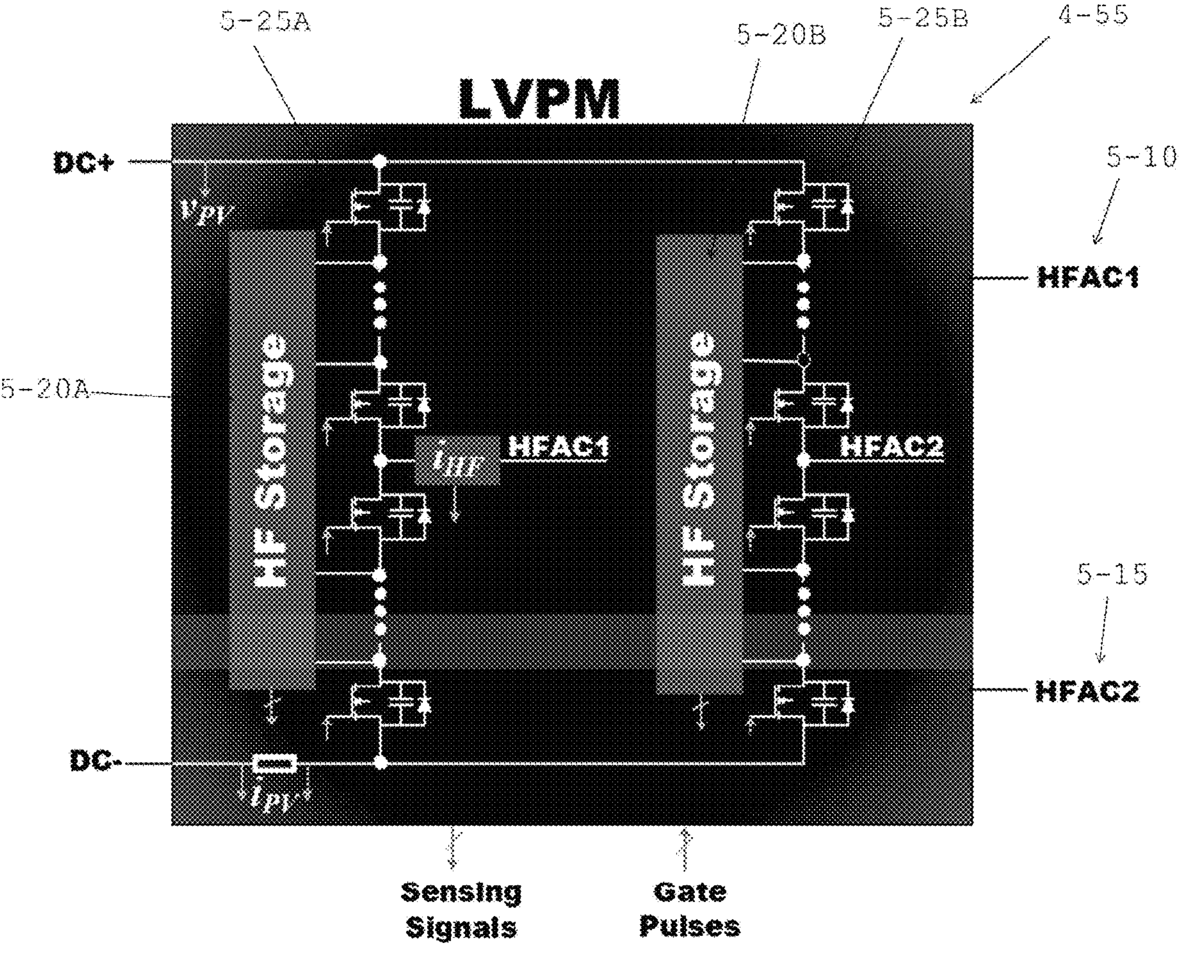
FIG. 5 illustrates the components of an LVPM according to one aspect of the present invention.
Figure 7:
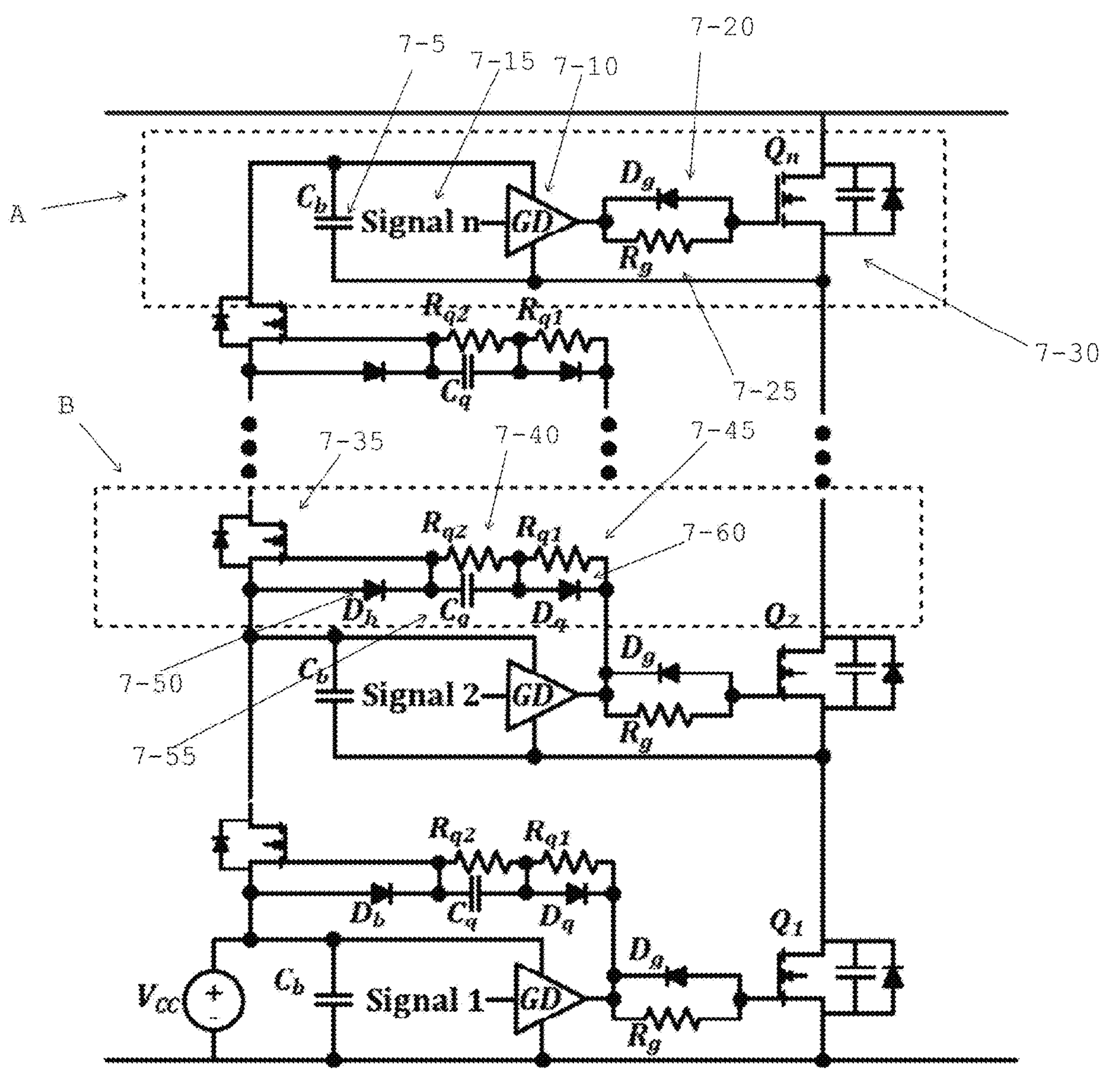
FIG. 7 is a circuit diagram of a gate drive circuit which may be used with various aspects of the present invention.

Referring to FIG. 5, an exemplary arrangement of the LVPM 4-55 is illustrated. As can be seen, this module 4-55 receives DC+ and DC− inputs (from the DC filter 4-45) and gate pulses (from the drive circuitry 4-65) as inputs. In turn, the module 4-55 produces outputs HFAC1 5-10 and HFAC2 5-15. These outputs HFAC1 5-10 and HFAC2 5-15 are received by transformer 4-85. The module 4-55 also produces the various sensing signals (such as the PV voltage, the PV current, the high frequency current, etc.) required for control purposes. These sensing signals are sent to/retrieved by the sensing circuitry 4-70. As can be seen, the LVPM 4-55 includes integrated power semiconductors as well as integrated High-Frequency (HF) storage blocks 5-20A, 5-20B. The module 4-55 may also include the power semiconductors' drive circuitry and sensing circuitry. FIG. 7 shows an exemplary arrangement of the integrated drive circuitry.

It should be clear that the various configurations of circuits and arrangements for the microinverter according to one aspect of the present invention will use the concept of circuit element modules. Each circuit element module includes a semiconductor, a diode, and a capacitor. For each circuit element module, the diode and capacitor are coupled in parallel with the semiconductor. The control signal for the semiconductor in each circuit element module is to be generated by the control system as determined by the digital control circuitry.

As shown in FIG. 5, there are two HF storage blocks 5-20A, 5-20B in the LVPM and that each is coupled to one of the two strings 5-25A, 5-25B of circuit element modules. Each of the strings 5-25A, 5-25B of circuit element modules is a string of circuit element modules coupled in series, with each string being coupled between the DC+ and DC− inputs. As such, the strings are coupled in parallel with each other between the DC+ and DC− inputs. String 5-25A produces the HFAC1 output while string 5-25B produces the HFAC2 output. String 5-25A is coupled to HF storage 5-20A while HF storage 5-20B is coupled to string 5-25B. The HFAC1 output is tapped from a midway point of string 5-25A while HFAC2 output is tapped from the midway point of string 5-25B. As can be seen, each HF storage 5-25A, 5-25B is coupled at coupling points on its related string of circuit element modules, with each coupling point being between adjacent circuit element modules in that string.

Figure 6:
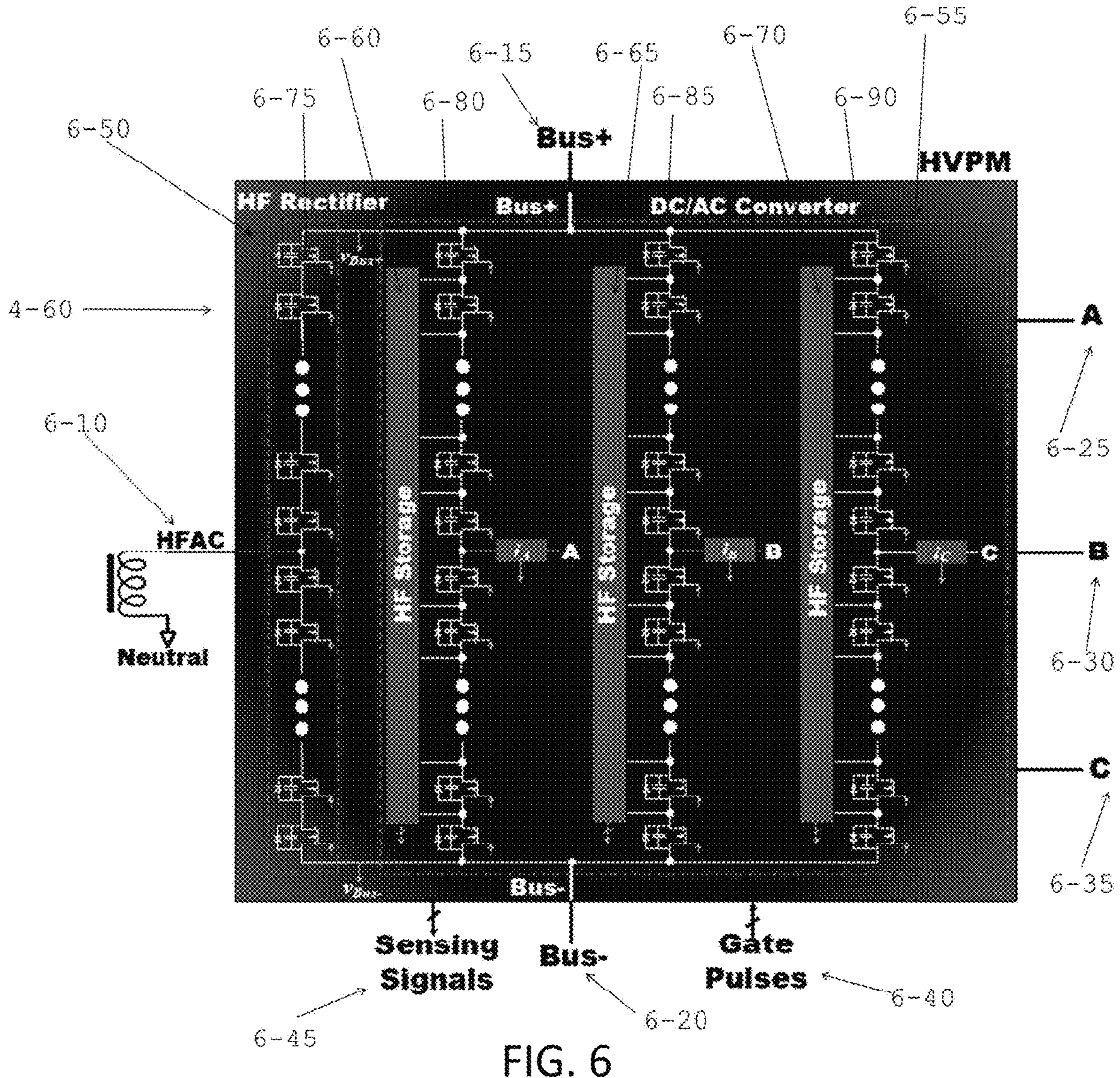
FIG. 6 illustrates the components of an HVPM according to one aspect of the present invention.

Referring to FIG. 6, an exemplary arrangement of the HVPM 4-60 is illustrated. As can be seen from the figure, the high-frequency AC (HFAC) input 6-10, inputs Bus+ 6-15, Bus− 6-20, outputs A 6-25, B 6-30, C 6-35, input gate pulses 6-40, and output sensing signals 6-45 are connected to this HVPM block 4-60. According to this figure, the HVPM 4-60 includes the following blocks:

An HF Rectifier block 6-50 for rectifying input high-frequency (HF) power to DC power, A DC/AC Converter block 6-55 that converts DC power from the DC-link to a three-phase AC power. This block 6-55 mainly includes power semiconductors as well as integrated high-frequency (HF) storage modules 6-60, 6-65, 6-70. These HF Storage blocks 6-60, 6-65, 6-70 are used for high-frequency storage purposes and usually include multiple capacitors, Sensing circuitry, which includes sensing various variables such as the bus voltage, the AC currents, etc., Drive Circuitry, which drive the power semiconductors in the circuit element modules.

For clarity, the HF storage blocks in both the LVPM and HVPM are provided to address both the low voltage semiconductors and low voltage capacitors in LVPM and the high voltage semiconductors and high voltage capacitors in HVPM. The HF storage blocks may take the form of banks of capacitors as necessary for the implementation. FIG. 7 shows an exemplary arrangement of drive circuitry which may be used with the HVPM 6-55.

As can be seen from FIG. 6, the rectifier block 6-50 is a string 6-75 of series connected circuit element modules. This string 6-75 is coupled between the Bus+ 6-15 and Bus− 6-20 inputs. In the middle of this string 6-75 is the input HFAC 6-10.

For the DC/AC converter block 6-55, there are three strings 6-80, 6-85, 6-90 of series connected or serially connected circuit element modules. These three strings 6-80, 6-85, 6-90 are coupled in parallel between the inputs Bus+ 6-15 and Bus− 6-20 inputs. The string 6-80 outputs the output A 6-25 from the middle of the string 6-80. String 6-85 outputs the output B 6-30 from the middle of string 6-85 while string 6-90 outputs the output C 6-35 from the middle of string 6-90. As can be seen, HF storage module 6-60 is coupled to string 6-80 while HF storage module 6-65 is coupled to string 6-85. As well, HF storage module 6-70 is coupled to string 6-90. Each of HF storage modules 6-60, 6-65, 6-70 is coupled at coupling points on its related string of circuit element modules, with each coupling point being between adjacent circuit element modules in that string.

For clarity, the HF rectifier block 6-50 is coupled in parallel with the DC/AC converter block 6-55 between the inputs bus+ 6-15 and bus− 6-20.

Referring to FIG. 7, an exemplary circuit for the drive circuitry to drive the semiconductors in the LVPM and in the HVPM is illustrated. As can be seen, the circuitry is a repeating pattern of two circuit blocks—a circuit block A and a circuit block B. From the bottom of the figure, the pattern begins with a circuit block A coupled to a circuit block B. Moving up from the bottom, this is then followed by a circuit block A coupled to a circuit block B and so on. The chain ends at the top with a circuit block A.

As can be seen, a circuit block A has a capacitor 7-5 between the power rails of an op-amp (operational amplifier) 7-10 that receives the input signal 7-15. The output of the op-amp 7-10 proceeds to a diode 7-20 and resistance 7-25 that are coupled in parallel. The other end of this parallel diode/resistance arrangement serves to drive a circuit element module 7-30.

Circuit block B has a driver semiconductor arrangement 7-35 that leads to a pair of resistances ($R_{q1}$, $R_{q2}$) 7-40, 7-45 in series that are in parallel with a series arrangement of diode 7-50, capacitor 7-55, and diode 7-60. A connection point between resistances 7-40, 7-45 is coupled to a connection point between capacitor 7-55 and diode 7-60. A connection point between semiconductor arrangement 7-35 is coupled to a connection point between diode 7-50 and capacitor 7-55. The common node between the ends of resistance 7-45 and diode 7-60 is coupled to the output of an op-amp from a preceding circuit block A.

Figure 8:
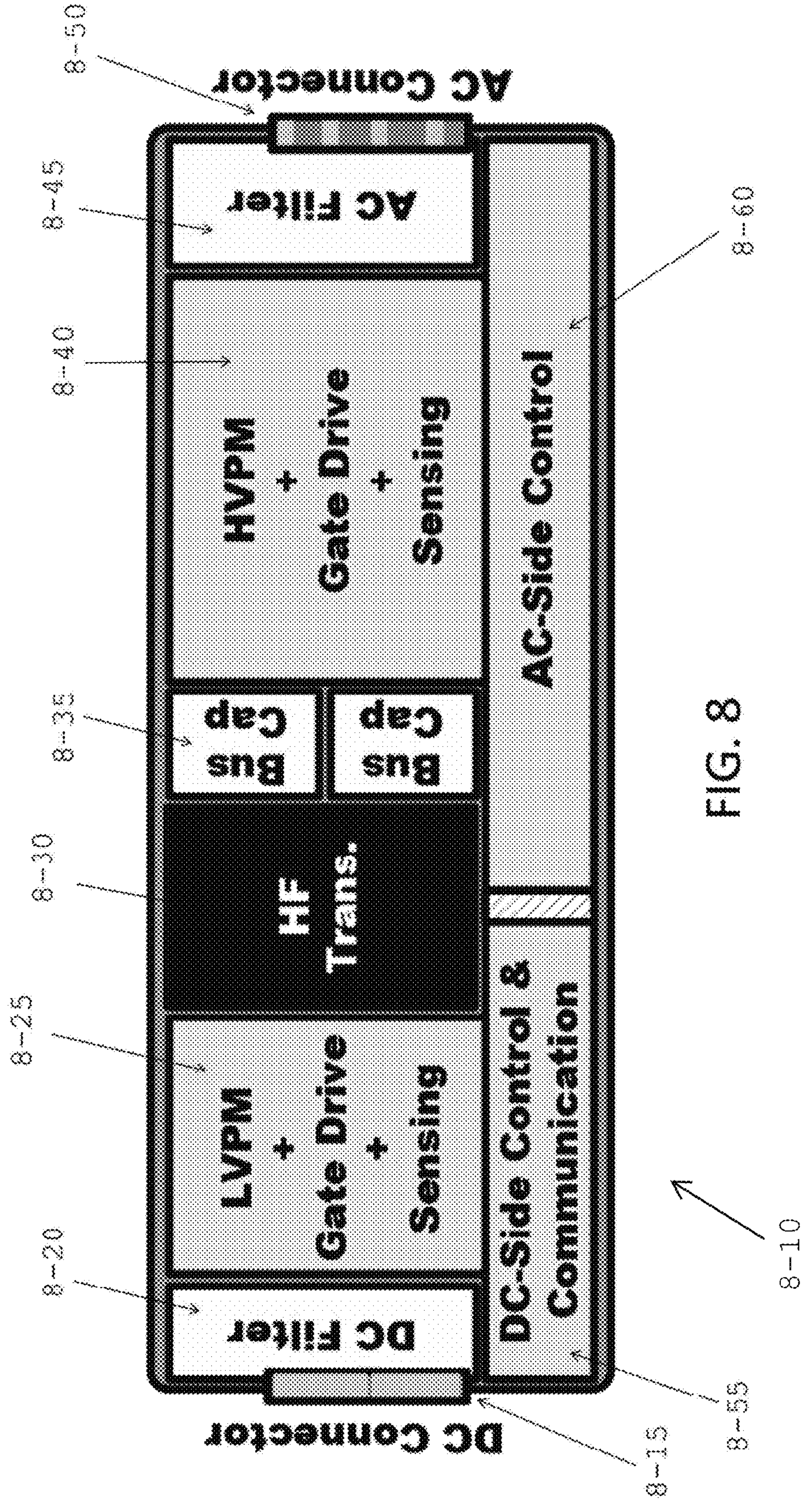
FIG. 8 shows one exemplary layout of a microinverter device according to one aspect of the present invention.

For clarity, the gate drive circuitry in FIG. 7 operates to drive the circuit element modules in the strings of circuit element modules in both the LVPM and HVPM. As such, each string of circuit element modules has a corresponding set of gate-drive circuitry such that each circuit element module in the string is driven by a corresponding pair of circuit block A and circuit block B circuits based on the value of the input signal received by the op-amp in the circuit block A. Of course, these input signals to the various relevant instances of circuit block A are generated by the relevant digital control circuitry for the LVPM or the HVPM. Referring to FIG. 8, an exemplary layout for the VA-Si PV microinverter according to one aspect of the present invention is shown. As can be seen, the VA-Si PV microinverter 8-10 includes the following blocks:

A DC Connector 8-15 that connects the PV wires (PV+, PV−) from the PV panel to the microinverter 8-10. This connector may include protection circuitry such as varistors, etc.

A DC Filter 8-20 that performs differential-mode and/or common-mode filtering at the PV side of the microinverter 8-10, An LVPM+Gate Drive+Sensing block 8-25. This block 8-25 includes the low-voltage power semiconductors along with their drive circuitry and sensing circuits An HF Transformer 8-30 that provides galvanic isolation between the PV side and the AC side and also provides any required voltage/current gains, DC Capacitors 8-35 that provides small storage capacity for the DC link. Additionally, the midpoint of the capacitors may be connected to Neutral. Such DC bus capacitors may be used for multiple purposes including providing temporary storage for unbalanced scenarios. Similarly, they may be used to avoid transformer saturation. The DC bus capacitors 8-35 may be part of the input side of the DC/AC converter of the HVPM and may form part of the DC-link component in the other figures.

An HVPM+Gate Drive+Sensing block 8-40 that includes the high-voltage power semiconductors along with their drive circuitry and sensing circuits.

An AC Filter 8-45 that performs differential-mode and/or common-mode filtering at the grid side of the microinverter, An AC Connector 8-50 that connects the grid wires (i.e., Line A, Line B, Line C, Neutral; GND may or may not be included) to the microinverter 8-10. This connector 8-50 may include protection circuitry such as varistors, etc., A DC-Side Control and Communication block 8-55, which includes various control loops (such as maximum power point tracking, etc.) on the PV side and a communication link to the outside world, An AC-Side Control 8-60 that includes various control loops (such as DC-link voltage control, AC current control, DCF bus voltage control loop, grid current control loop, PLL, etc.) on the grid side.

For clarity, while FIG. 8 and other figures show that the gate drivers and sensing circuitry for the LVPM are on the same block as the LVPM, depending on implementation, these circuits may, depending on implementation, be placed on different blocks and/or at different locations. Similar considerations also operate for HVPM and its gate drivers and sensing circuitry—these may be co-located with the HVPM on the same block or, depending on implementation, on another block/location.

Figure 9:
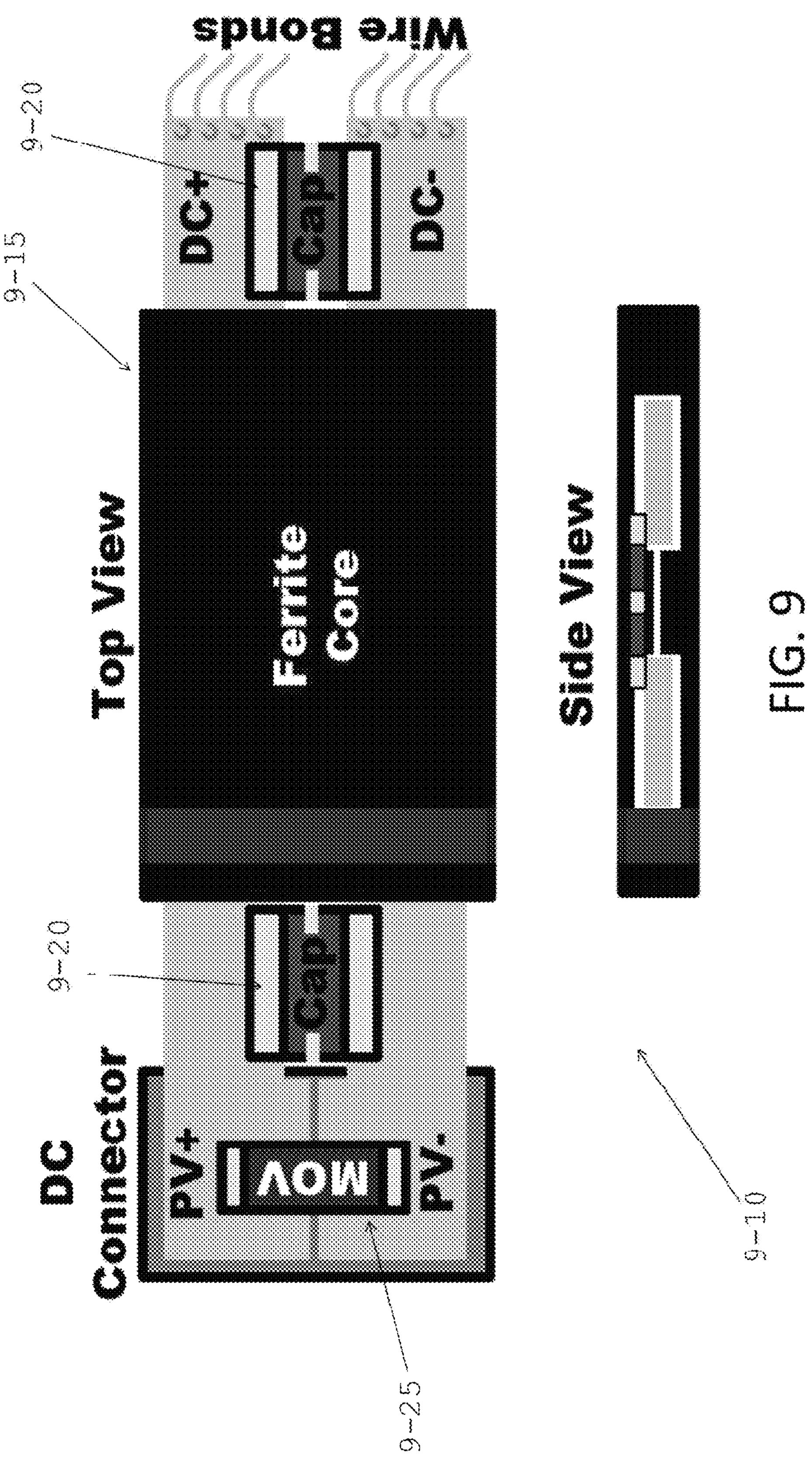
FIG. 9 shows an arrangement of a DC filter which may be used with various aspects of the present invention.

Referring to FIG. 9, an exemplary layout for the DC Filter is shown. The DC Filter performs differential-mode and/or common-mode filtering. The DC Filter may utilise integrated X-Y capacitors and certain types of magnetics. This figure also shows the DC connector which may include the protection components.

The DC filter 9-10 includes a ferrite core 9-15 that is flanked on two sides by capacitors 9-20. On one side of the ferrite core, the capacitors 9-20 is between the ferrite core and the metal oxide varistor (MOV) 9-25. As should be clear, the MOV 9-25 forms part of the protection circuitry that couples to the DC connector to the PV panel. On the other side of the ferrite core, the capacitors 9-20 are between the ferrite core and the wire bonds that couple to the LVPM block 8-25 (see FIG. 8).

Figure 10:
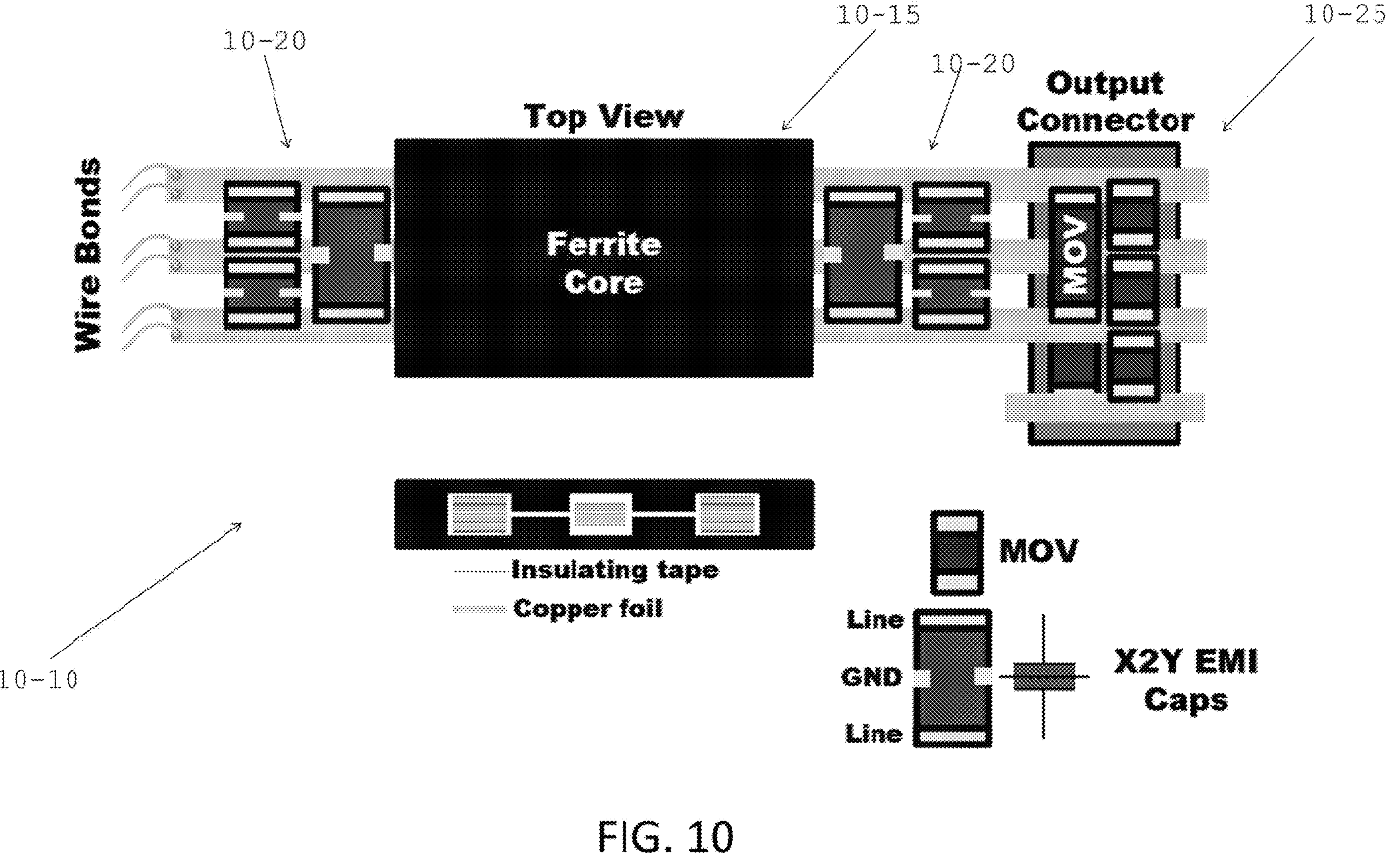
FIG. 10 illustrates one arrangement of an AC filter which may be used with various aspects of the present invention.

Referring to FIG. 10, illustrated is an exemplary layout for the AC Filter 10-10. The AC Filter 10-10 performs differential-mode and/or common-mode filtering. The AC Filter may utilise integrated X-Y capacitors and certain types of magnetics. This figure also shows the AC connector which may include the protection components.

From the figure, the AC filter 10-10 includes a ferrite core 10-15 and capacitors 10-20 on both sides of the ferrite core. On one side of the ferrite core, the capacitors 10-20 are between the ferrite core and the wire bonds that couple to the HVPM block 8-40 (see FIG. 8). On the other side, the capacitors 10-20 are between the ferrite core and the output connector 10-25. The output connector 10-25 includes suitable protection circuitry such as metal oxide varistors (MOV).

Figure 11:
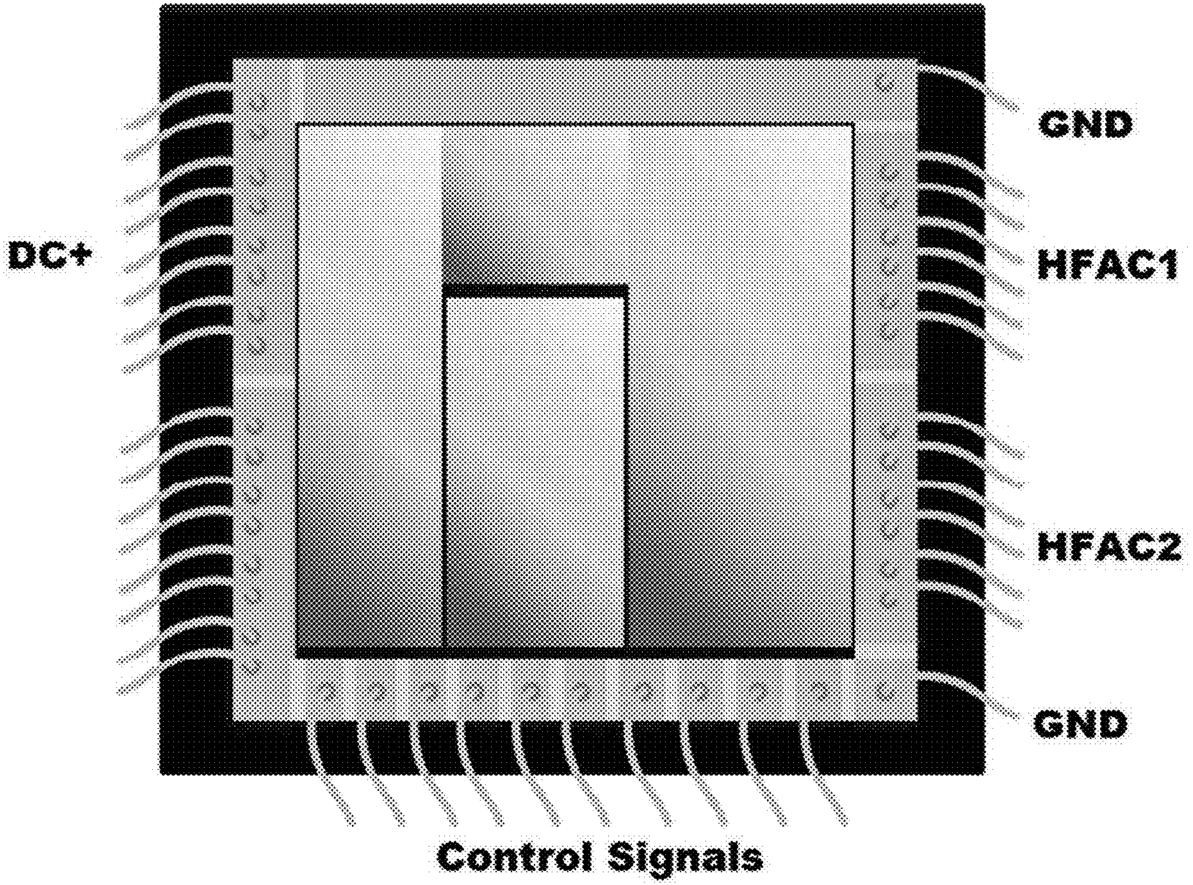
FIG. 11 shows an arrangement of an LVPM in one implementation.
Figure 12:
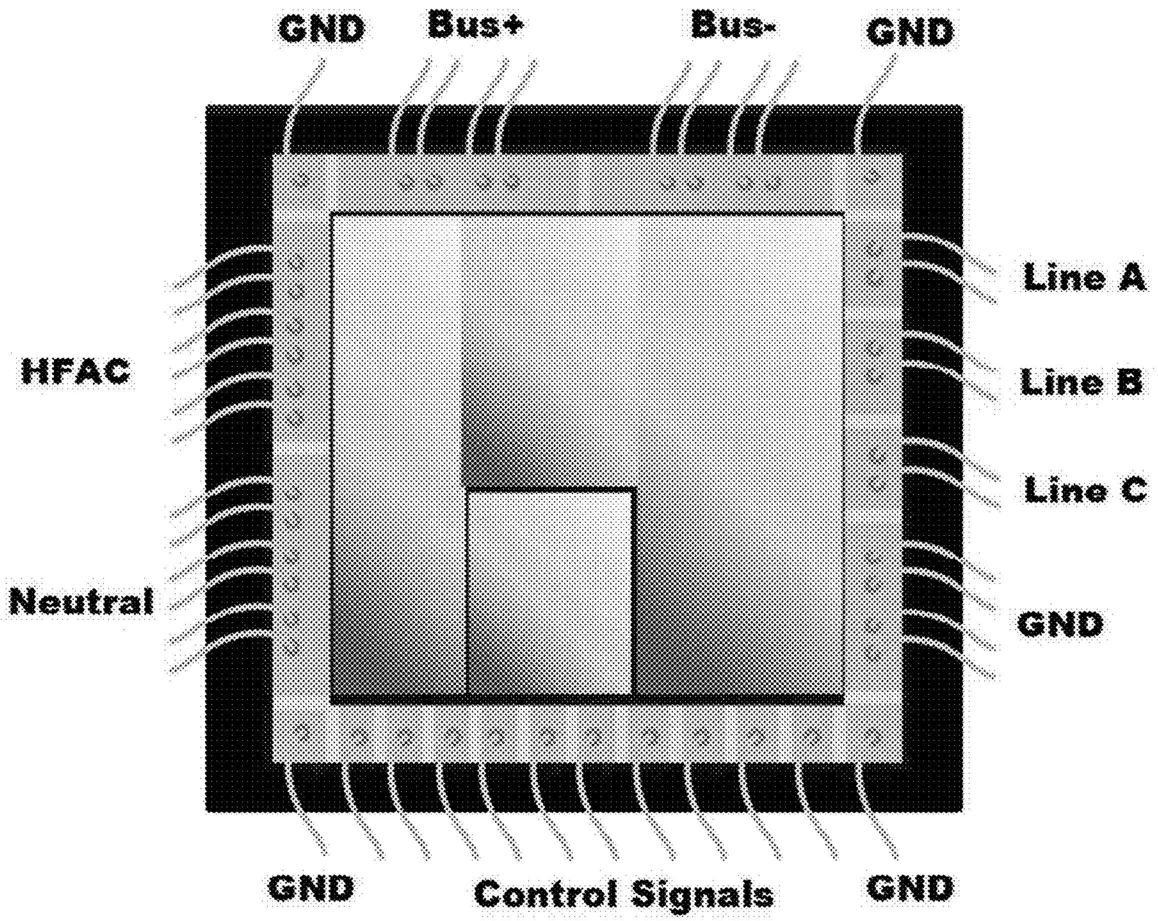
FIG. 12 illustrates an arrangement of an HVPM in one implementation.

The integrated module can be implemented in different ways. One way to implement the integrated modules is to have separate integrated chips for the LVPM and HVPM. FIG. 11 and FIG. 12 show the arrangements for LVPM and HVPM respectively.

Figure 13:
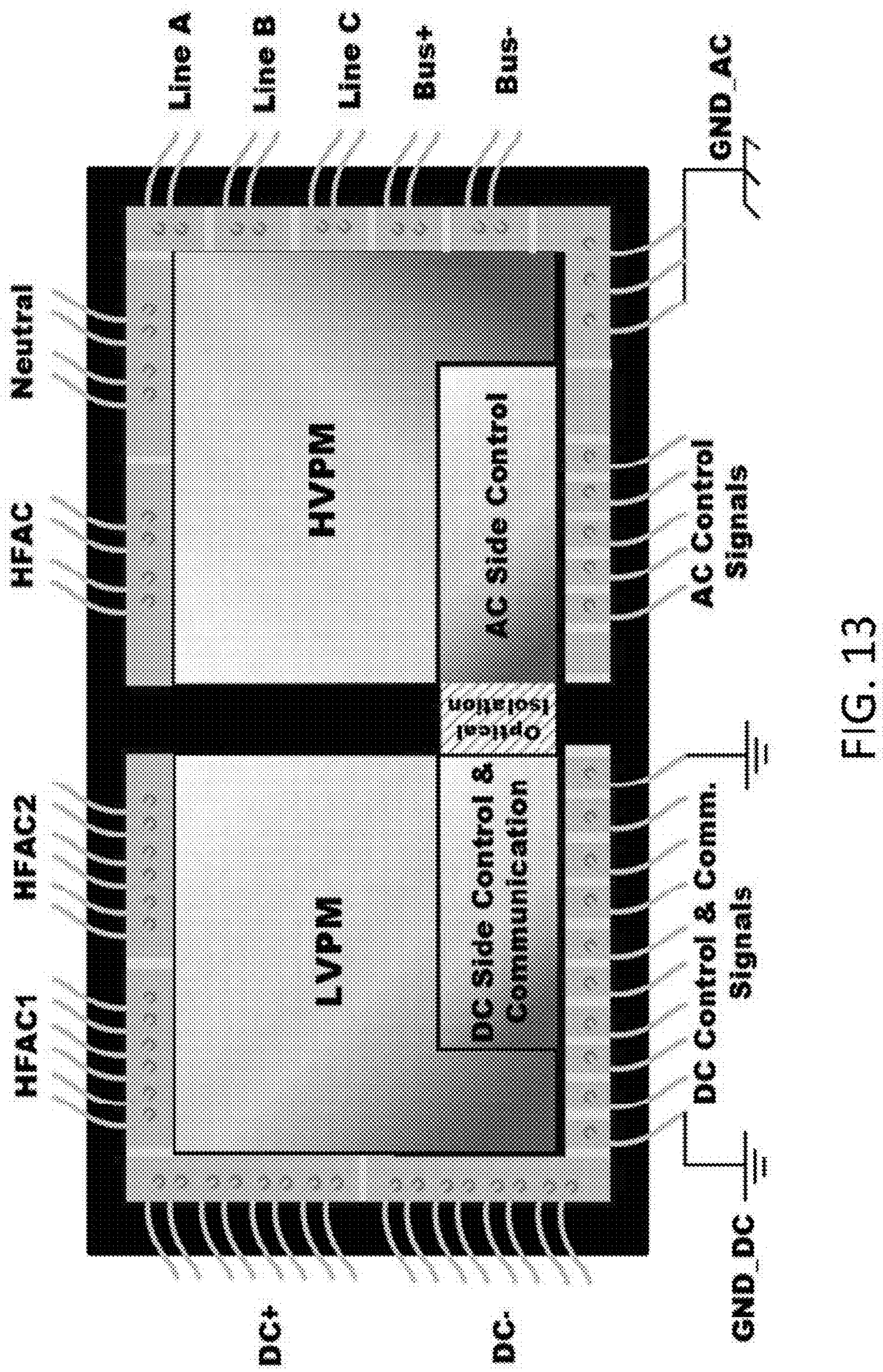
FIG. 13 shows an arrangement of microinverter circuitry according to one aspect of the present invention.

Referring to FIG. 13, an exemplary layout for the proposed integrated chip is shown. According to this figure, the low-voltage parts and high-voltage parts are co-packaged into a single chip. A common substrate can be used, or two different substrates can be used. In one implementation, the integrated chip includes LVPM, DC-Side Control and Communication, HVPM, AC-Side Control. The DC-Side Control and AC-Side Control may be linked through an isolating link (e.g., optical isolators). It should, of course, be clear that the DC side control and communications circuitry may be placed on a separate chip and/or substrate from the LVPM. Similarly, the AC side control circuitry may be located on a separate chip and/or substrate from the HVPM.

Figure 14:
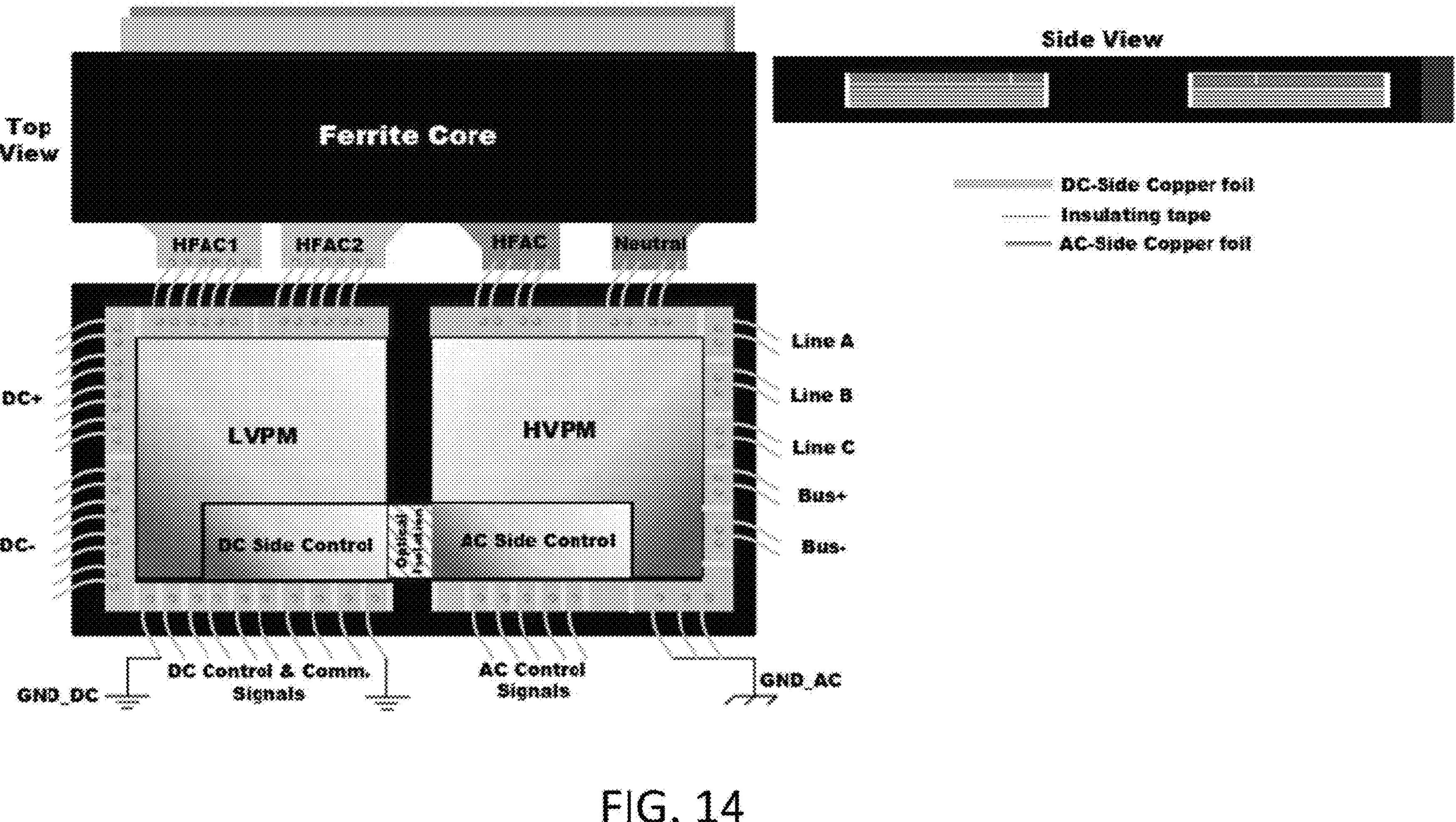
FIG. 14 is a diagram showing the arrangement in FIG. 13 incorporated with a transformer.
Figure 15:
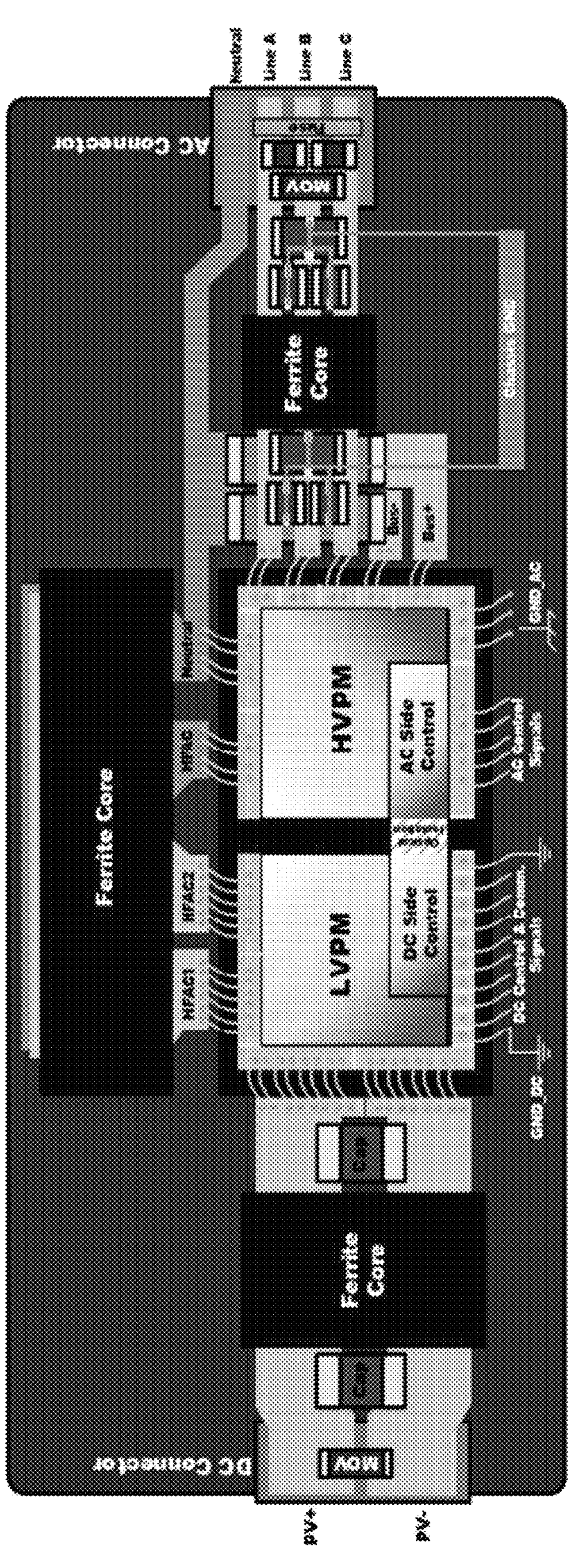
FIG. 15 is a diagram illustrating a complete microinverter package according to one aspect of the present invention and which includes the microinverter circuitry, a transformer, a DC filter, and an AC filter.
Figure 16:
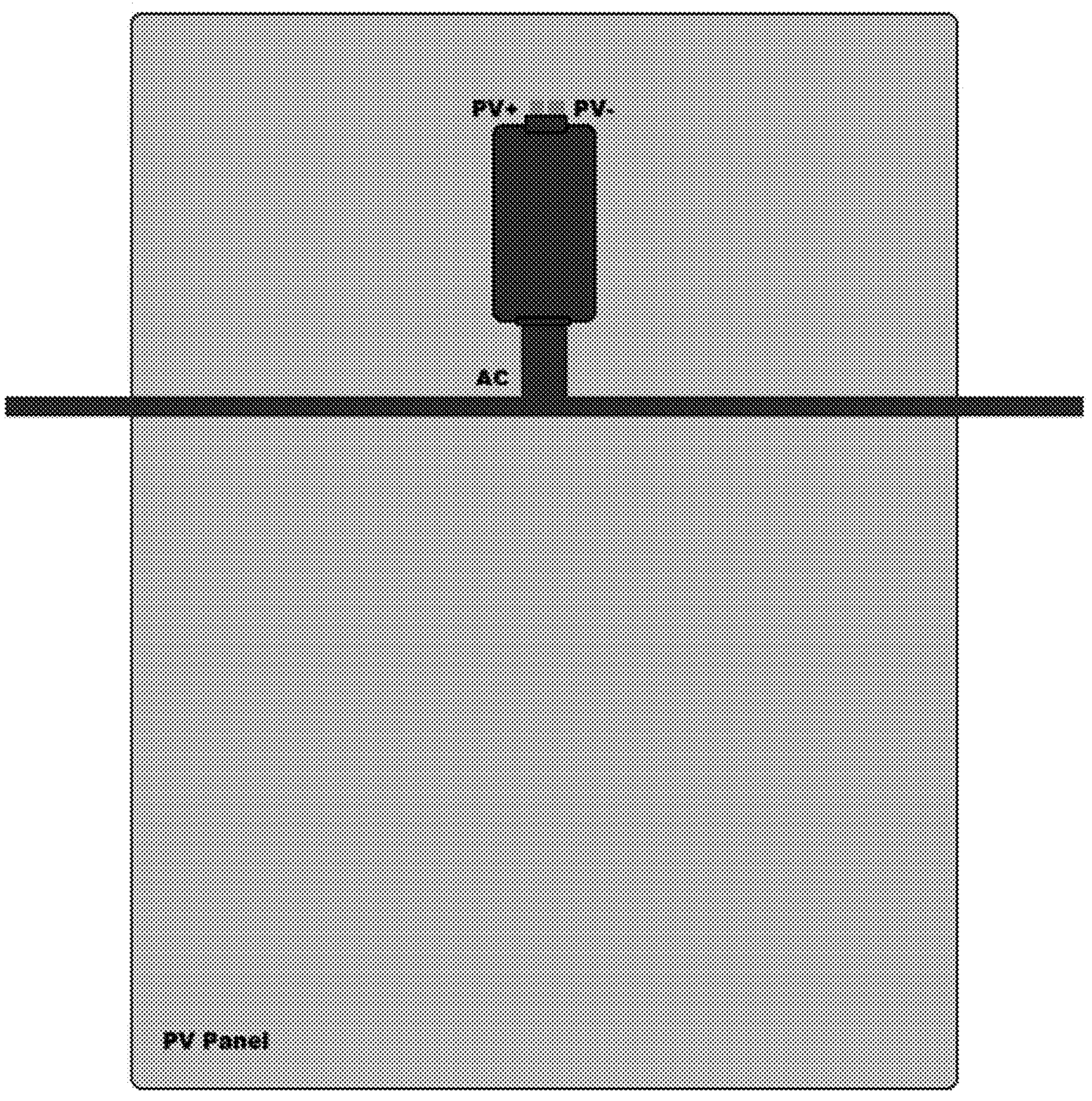
FIG. 16 shows an example microinverter package as connected to a PV panel.

FIG. 14 and FIG. 15 show how the integrated chip is connected to other components in the circuit. For greater clarity, FIG. 15 shows the complete self-contained package for a microinverter suitable for coupling to a single PV panel. FIG. 16 illustrates how the VA-Si PV microinverter according to one aspect of the present invention may be connected to a PV panel.

A person understanding this invention may now conceive of alternative structures and embodiments or variations of the above all of which are intended to fall within the scope of the invention as defined in the claims that follow.

We claim:

1. A microinverter comprising:
- a low voltage power module (LVPM) that receives a power signal directly from a photovoltaic (PV) panel and conditions said power signal;
- a transformer receiving power from said LVPM on said transformer's primary side;
- a high voltage power module (HVPM) that receives converted AC power from said transformer and converts said AC power into three phase AC power for direct provision to an AC power bus, wherein
- said microinverter is for directly connecting to a single PV panel;
- said transformer provides galvanic isolation between said LVPM and said HVPM, said transformer being coupled to said LVPM and to said HVPM;
- said microinverter is for directly connecting to said AC power bus, said AC power bus being for providing 3 phase AC power to an AC power grid;
- said microinverter is packaged as a single unitary device.

2. The microinverter according to claim 1 wherein, prior to being received by said LVPM, said power signal from said PV panel is filtered by a DC filter.

3. The microinverter according to claim 2 wherein said DC filter is integrated into said single unitary device.

4. The microinverter according to claim 2 wherein said DC filter comprises a ferrite core coupled between a first capacitor and a second capacitor, said second capacitor providing a positive DC input and a negative DC input to said LVPM, said first capacitor being between said ferrite core and a DC connector that connects to said one PV panel.

5. The microinverter according to claim 1 wherein, prior to being received by said AC power bus, said 3 phase AC power from said HVPM is filtered by an AC filter.

6. The microinverter according to claim 5 wherein said AC filter is integrated into said single unitary device.

7. The microinverter according to claim 5 wherein said AC filter comprises a ferrite core coupled between a first group of capacitors and a second group of capacitors, said first group of capacitors receiving three phase AC power from said HVPM and said second group of capacitors being coupled between said ferrite core and an output connector, said output connector being for connecting to said AC power bus.

8. The microinverter according to claim 1 wherein semiconductors in said LVPM are controlled by a DC side digital control subsystem.

9. The microinverter according to claim 8 wherein said DC side digital control subsystem is integrated into said single unitary device.

10. The microinverter according to claim 1 wherein semiconductors in said HVPM are controlled by an AC side digital control subsystem.

11. The microinverter according to claim 10 wherein said AC side digital control subsystem is integrated into said single unitary device.

12. The microinverter according to claim 1 wherein said LVPM comprises:
- at least one string of circuit element modules, each of said at least one string of circuit element modules being coupled in parallel between a positive DC input and a negative DC input;

wherein
- each string of circuit element modules comprises a plurality of circuit element modules coupled in series;

each string of circuit element modules produces an output received by said transformer, said output being tapped from a midpoint of said string of circuit element modules;

each string of circuit element modules further comprises a high frequency storage block for storing power, said high frequency storage block being coupled to said string of circuit element modules at multiple coupling points on said string of circuit element modules, each of said multiple coupling points being between a pair of circuit element modules coupled in series to one another in said string of circuit element modules.

13. The microinverter according to claim 1 wherein said HVPM comprises:

a high frequency rectifier block for receiving an output of the transformer;

a DC/AC converter block producing outputs of said HVPM;

wherein said high frequency rectifier block is coupled in parallel with said DC/AC converter block between a positive bus input and a negative bus input to said microinverter.

14. The microinverter according to claim 13 wherein said high frequency rectifier block comprises:

a string of circuit element modules, said string of circuit element modules comprising a plurality of circuit element modules coupled in series, wherein an input to said high frequency rectifier block is received at a midpoint of said string of circuit element modules.

15. The microinverter according to claim 13 wherein said DC/AC converter block comprises:

a plurality of strings of circuit element modules coupled in parallel with one another, each of said plurality of strings of circuit element modules providing one output of said HVPM;

wherein each of said plurality of strings of circuit element modules comprises a plurality of circuit element modules coupled in series;

for each string of circuit element modules, said one output is tapped from a midpoint of said string of circuit element modules;

each string of circuit element modules further comprises a high frequency storage block for storing power, said high frequency storage block being coupled to said string of circuit element modules at multiple coupling points on said string of circuit element modules, each of said multiple coupling points being between a pair of circuit element modules coupled in series to one another in said string of circuit element modules.

16. The microinverter according to claim 15 wherein said a plurality of strings of circuit element modules comprises three strings of circuit element modules producing three phase AC power for said AC power bus.

17. The microinverter according to claim 1 wherein high frequency storage blocks used in said microinverter comprises capacitor banks.

* * * * *